United States Patent [19]

Calkins et al.

[11] 4,393,313
[45] Jul. 12, 1983

[54] WIDTH DETECTOR SYSTEM

[75] Inventors: James D. Calkins, Oak Brook Terrace; Eugene E. Bushong, Bensenville; Lee R. Schuck, Buffalo Grove, all of Ill.

[73] Assignee: Binks Industries, Inc., Wood Dale, Ill.

[21] Appl. No.: 258,738

[22] Filed: Apr. 29, 1981

[51] Int. Cl.³ .......................................... G01N 21/86
[52] U.S. Cl. .................................. 250/560; 250/571; 356/386
[58] Field of Search ............... 250/560, 571; 356/384, 356/385, 386, 387

[56] References Cited

U.S. PATENT DOCUMENTS

| 2,548,590 | 4/1951 | Cook | 356/387 |
| 2,730,006 | 1/1956 | Gottschall | 356/385 |
| 2,810,316 | 10/1957 | Snyder | 250/560 X |
| 2,931,917 | 4/1960 | Beelitz | 250/560 X |
| 2,941,087 | 6/1960 | Blumberg et al. | 356/386 |

Primary Examiner—David C. Nelms
Assistant Examiner—Edward P. Westin
Attorney, Agent, or Firm—McCaleb, Lucas & Brugman

[57] ABSTRACT

Apparatus for continuously measuring the width of moving strip materials and visually displaying such measurements; the same utilizing a pair of motorized edge sensors for locating and following the strip edges relative to a fixed reference datum and signal generators for measuring the width of the material and energizing alarm and/or recording systems whenever the measured width exceeds predetermined tolerance limits.

9 Claims, 7 Drawing Figures

WIDTH DETECTOR SYSTEM

BACKGROUND OF THE INVENTION

This invention relates generally to the art of measuring and more particularly to monitoring the width of moving strip materials regardless of strip speed, thickness, length or overall inclusive width. More particularly, this invention concerns improvement in electromechanical gauge systems for monitoring the width of moving strip materials.

DESCRIPTION OF PRIOR ART

In the past, width gauges of the order indicated above have involved mechanical systems employing elements in contact with the edges of the moving strip materials. Depending on the material involved, such contact systems can damage the strip edges and in other instances are incapable of the following the edges with consistant accuracy, particularly at high speeds when wide variations in edge thickness and roughness are encountered. In other instances, complex optical systems have been employed in order to avoid physical contact with the sheet edges. Such known optical systems generally locate and follow the strip edges through the use of light beams, light sensitive cells and reflective mirrors. However, systems of this nature are generally susceptible to ambient factors, particularly dust, which occludes the mirror reflective light source and thus hampers consistent operating performance.

By and large, the above mentioned and other known systems for measuring the width of moving sheet materials have been characterized by poor mechanical response, excessive wear, and/or complicated optical and electrical systems and circuitry.

It is an object of the present invention to provide an improved, simplified and accurate system for continuously monitoring the width dimension of moving strips of opaque materials.

It is another object of this invention to provide an improved width detector system for continuously following opposing edges of a moving material strip and for measuring the distance of each edge relative to a fixed reference datum.

SUMMARY OF THE INVENTION

In brief, the present invention comprises a pair of edge sensor means combined with a measuring system; each sensor means having a light source and a photo resistive light sensor or receiver supported on a movable carriage. Each light source and sensor are vertically spaced over opposite edges of the moving strip material and carried on a carriage means which is driven by a reversible drive motor and lead screw. A pulse generator is directly coupled to each carriage driving motor to yield output signals which are used to indicate the position of that carriage relative to a fixed reference while the sensors produce signals to effect movement of the carriages to follow the strip edges. Each pulse generator provides signals to input conditioning logic and associated electronic circuitry including totalizer means for constantly recording or displaying the measured width of the sheet material and for comparing such measured width with preset tolerance limits. Whenever the preset tolerances are equalled or exceeded, appropriate visual or audible alarm signals are initiated along with a means for recording the width of the strip material.

Having thus described this invention, the above and further objects, features and advantages thereof will appear to those familiar with the art from the following detailed description of a preferred embodiment thereof, illustrated in the accompanying drawings and representing the best mode presently contemplated for carrying out its teachings.

DESCRIPTION OF THE PREFERRED EMBODIMENT

Figure 1:
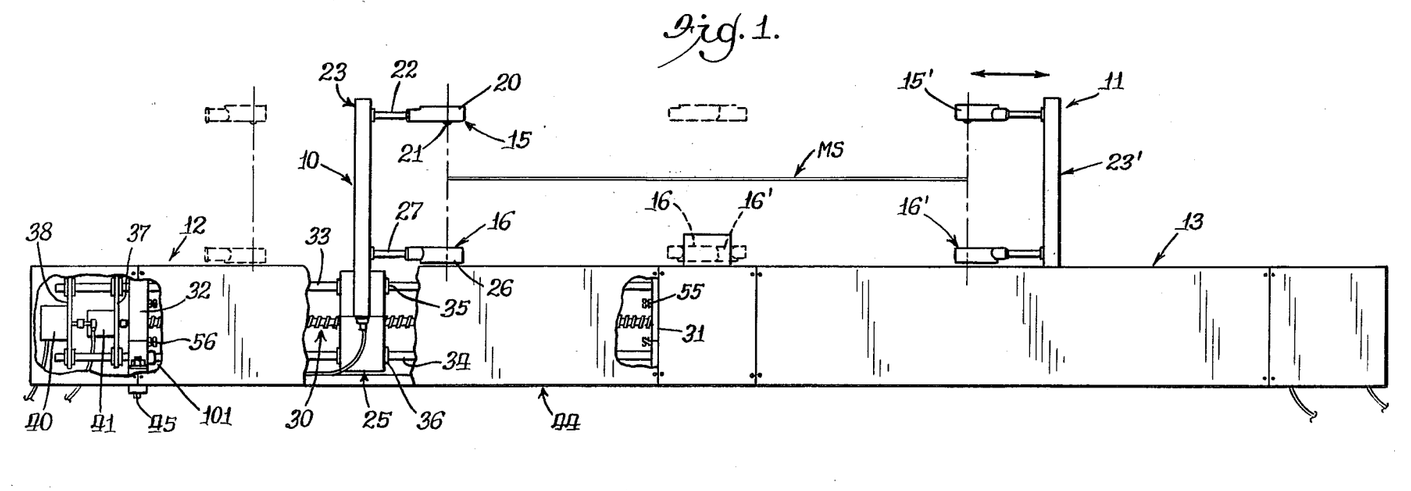
FIG. 1 is a view in side elevation with portions broken away to demonstrate structural aspects of the edge sensor assembly, and the relation thereof to strip materials to be measured.
Figure 2:
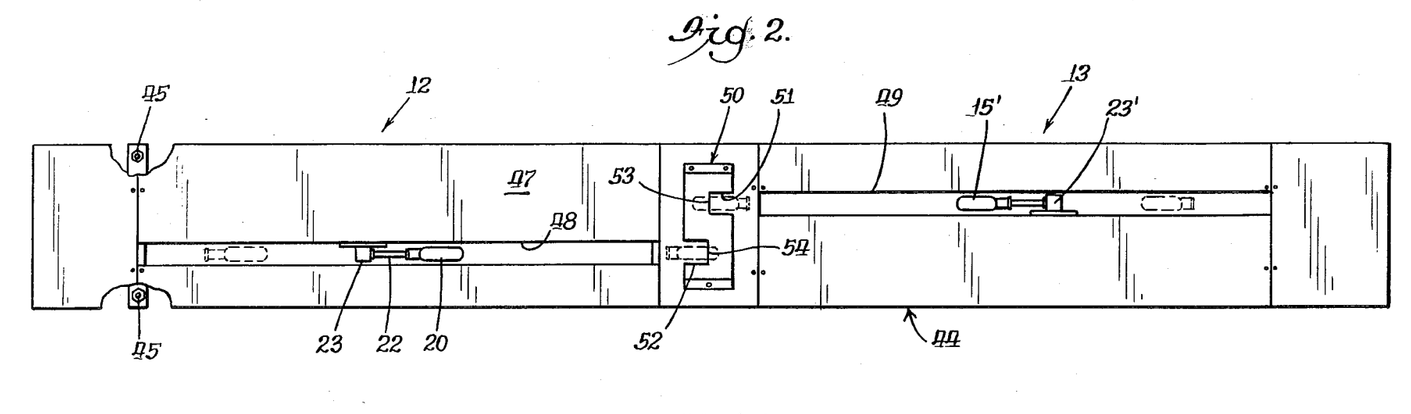
FIG. 2 is a top plan view of the assembly illustrated in FIG. 1.

Turning now to the description of the preferred form of the invention as illustrated in the accompanying drawings, particular reference is made to FIGS. 1 and 2 showing a pair of edge sensor means 10 and 11 in operational relationship with and along opposite margins of a moving strip of material, labeled MS. Each sensor means 10 and 11 is driven or moved along an axis at right angles to the longitudinal axis of the moving strip MS by a carriage and control assembly 12 and 13, respectively.

The sensor means 10 and 11, respectively, comprise a light source 15, 15' and a photo resistive light sensor or receiver 16, 16', superposed in vertically spaced alignment with the light source located over the upper side of the strip MS and the photo sensitive receivers beneath the lower side thereof. Vertical displacement between each light source and its receiver is preferably in the order of one foot in order to accommodate edge and end deformations of the strip material and to avoid the likelihood of damage which can occur when encountering wrinkled or dogeared materials.

Turning now to the particulars of the sensor means, the left hand means 10 will be described inasmuch as it is identical to the right hand sensor means 11. The light source 15 comprises an incandescent lamp (not shown) mounted in a housing 20 behind a lens 21 located on the lower side of the housing 20. The housing 20 in turn is supported by a horizontally extending tubular brace 22 attached to a vertically upright mounting post 23. Post 23 is fixed at its lower end to a movable carriage means 25, as will be described in greater detail presently.

The second element of the sensor means 10 comprises the photo resistive light sensor 16 mounted within a housing 26 carried by a tubular brace 27 which also is fixed to the mounting post 23, similar to the construction employed for the light source. It will be noted that the light source 15 and the sensor 16 are aligned in vertically spaced relationship, as heretofore mentioned, to extend horizontally from the mounting post 23 for operation adjacent one lateral edge or margin of the opaque strip material MS. Further it will be noted that the light source 15 and the sensor 16 are substantially equal distances above and below the movable strip as shown in FIG. 1. Typically, the photo sensor is shielded by a slotted cover (not illustrated) with the size and shape of the slot designed so that the light input to the sensor is proportional to the area of the slot.

As previously mentioned, the mounting posts 23, 23' for supporting the two light sensor assemblies are mounted on individual movable carriage means, each of which is driven by a zero backlash lead screw 30, designed for required torque and small incremental movements. The lead screw 30 is supported adjacent its opposite ends by spaced vertical support members 31 and 32 which are fixed in their positions and each of which respectively supports a pair of vertically spaced horizontal slide rods 33 and 34, along which the carriage is guided. The rods 33 and 34, pass through suitable bearings 35 and 36, respectively, of the carriage means 25 and also through the support member 32 and a pair of parallel spaced plates 37 and 38 on which are mounted a bidirectional stepper motor 40 and a pulse generator 41. The motor and pulse generator are directly coupled to each other and the lead screw.

The above described carriage, slide bars, pulse generator, stepper motor, etc. are all enclosed within a substantially rectangular shaped housing, indicated generally at 44, having pairs of mounting studs 45 adjacent its opposite ends for attaching the same to an underlying support. The upper wall 47 of the housing is distinguished by a pair of non-aligned elongated slotted openings 48 and 49 through which the mounting posts 23, 23' of the sensor means 10 and 11 extend for movement toward and away from the opposite lateral edges of the moving strip MS in response to driving activity of the two lead screws.

From an examination of FIG. 2 it will be recognized that the left and right hand sides of the illustrated assembly are identical with the exception that the operating axis of the lead screws and thus their mounting posts 23, 23' are misaligned in parallel spaced fashion so that the sensor means 10 and 11 may be moved to the middle of the assembly in overlapping relationship (see the dotted line showing in FIG. 1), for purposes to be described in greater detail hereinafter. It also will be appreciated that the two sensor means 10 and 11 are movable between extreme movement limits as indicated by the dotted line showing of the light source 15 and its sensor means 16 in FIG. 1.

Mounted midway of the upper wall 47 of the machine housing is a zeroizing fixture 50 distinguished by a pair of rectangular shaped cutouts or notches 51 and 52 extending inwardly from opposite lateral margins of fixture 50 and having coplanar aligned bottom edges 53 and 54, respectively. Such edges 53 and 54 are located on the center line of the machine, particularly housing 44. This permits the operator to zeroize the two sensor assemblies 10 and 11 by moving their carriages 25 toward one another until the same are located in the zeroizing fixture 50. The sensor assemblies then may be aligned by nulling the sensors at the mechanical zero point provided by the aligned bottom edges 53 and 54 of the zeroizing fixture slots 51 and 52. Thereafter the two carriages are backed out to their maximum lateral limits after which the strip material may be fed or inserted between the sensor assemblies 10 and 11; it being understood that the strip material is carried on a normal rolling mill line or the like in accordance with conventional strip handling practice.

Adjustments of the inner and outer movement limits for the two carriages are set by moving adjustable stop means 55 and 56 located on the two support members 31 and 32 (see FIG. 1).

Having thus described the basic electro-mechanical aspects of this invention, attention is now directed to the control means for regulating the functioning and movements of the two sensor means 10, 11 and establishing meaningful measurements of these positions relative to the fixed reference datum provided by the zeroizing fixture 50. In considering this aspect, it should be noted that in general the photo-resistive light sensors 16, 16' control the stepper motors and thus the carriage movements, while the pulse generators 41 provide control signals for associated electronic measurement means. Initial consideration will be directed to the sensor system and its control of the stepper motors, as represented schematically in FIG. 3 of the drawings.

Figure 3:
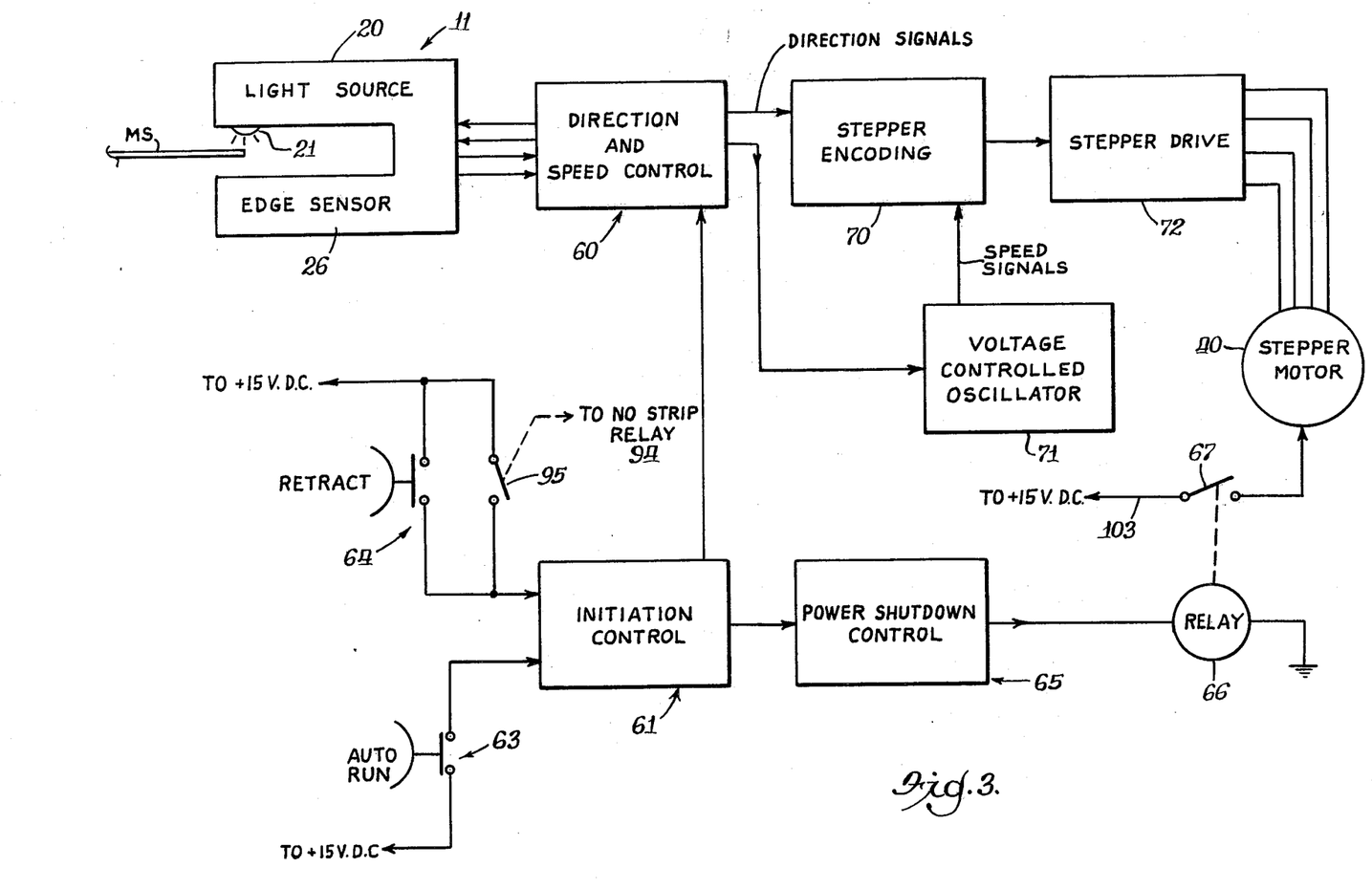
FIG. 3 is a functional block diagram of an edge sensor and controls.

As represented, each sensor 10 and 11, generates signals depending on increase and decrease of light intensity to which the photo resistor is exposed, according to known principles. These are proportional signals depending on whether or not the strip material occludes the photo resistor from the light source. These signals are supplied to a direction and speed control module 60 and a related control network for regulating rotational direction and speed of the related stepper motor 40.

Module 60 also receives input signals from an initiation control unit 61 for effecting manually controlled retraction or outward movement of the carriages and sensors, as when testing or setting up the machine for operation, as will be amplified hereinafter. Control unit 61 is supervised by two manually operated switch means 63 and 64 for respectively starting and running the machine and ordering reverse or retracting movement of the sensor supporting carriages as selected. This unit also supplies input signals to a power shut-down control 65 for effecting automatic de-energization of both stepper motors 40 in the event both carriages remain at their fully retracted position for a predetermined time interval.

The output side of the direction and speed control 60 provides directional signals to a conventional stepper encoder 70 and also provides "high" or "low" signals to a voltage controlled oscillator 71; the signal output of which is fed to the stepper encoder 70 for providing speed of rotation signals to a standard stepper drive module 72.

Both the directional signals from control 60 and the rotational speed control signals from the oscillator 71 are suitably coded in a conventional encoder unit 70 and thereafter fed to the stepper drive 72 where they are amplified to provide usable appropriate "high" and "low" drive signals for the stepper motor 40. Such amplified signals determine the rotational direction and rotational speed of the motor. Since the stepper motor rotatably drives the lead screw 30, this establishes movement of the sensor carrying carriage 25 and inasmuch as the stepper motor is also coupled to the pulse generator, operation of the latter also follows to provide "high" and "low" control signals for the measurement system. It will be understood that each of the sensor is coupled to a control network of the order indicated in FIG. 3.

Figure 4:
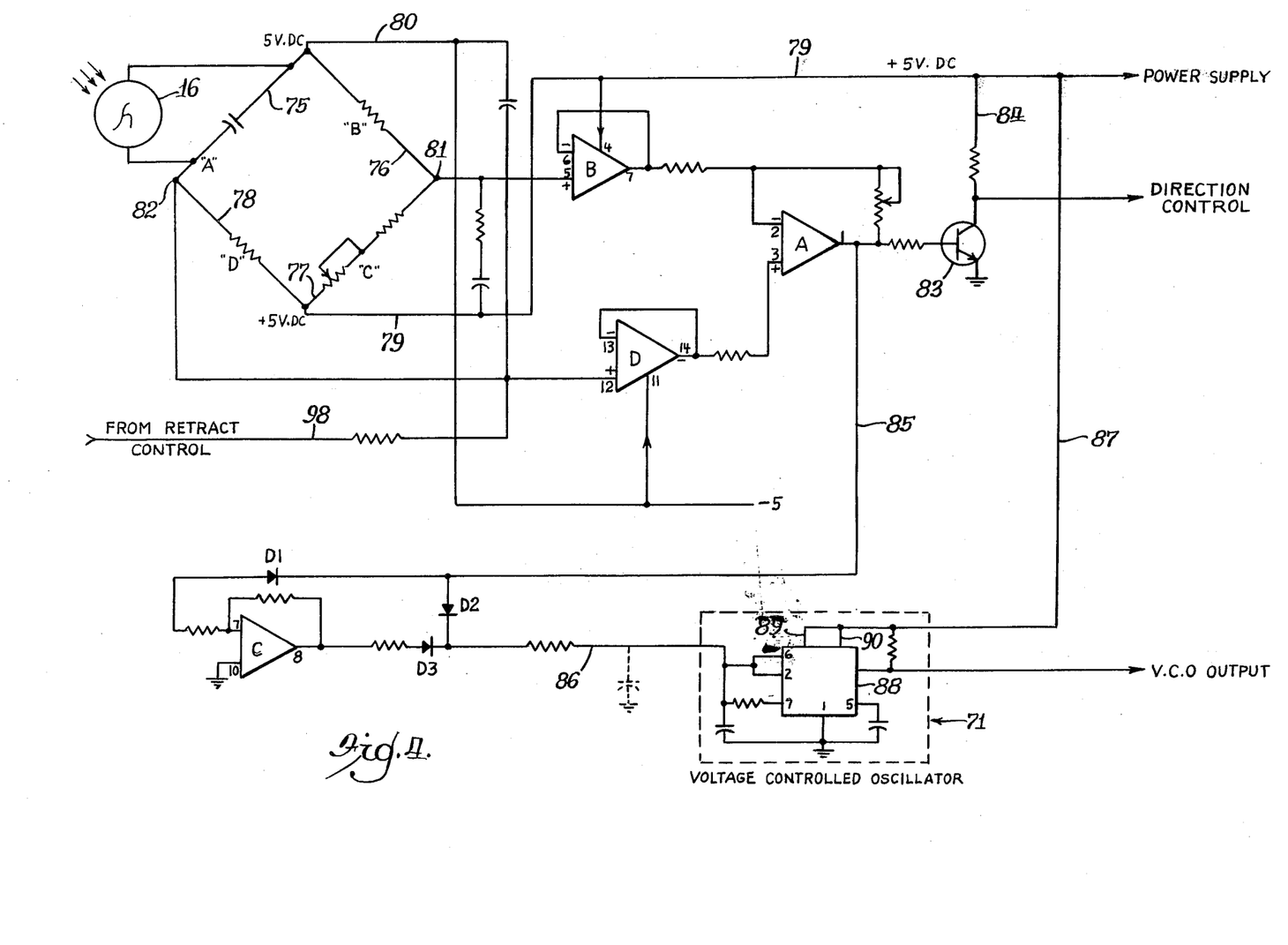
FIG. 4 is a schematic circuit diagram of the direction and speed control system indicated in FIG. 3.
Figures 5, 6A:
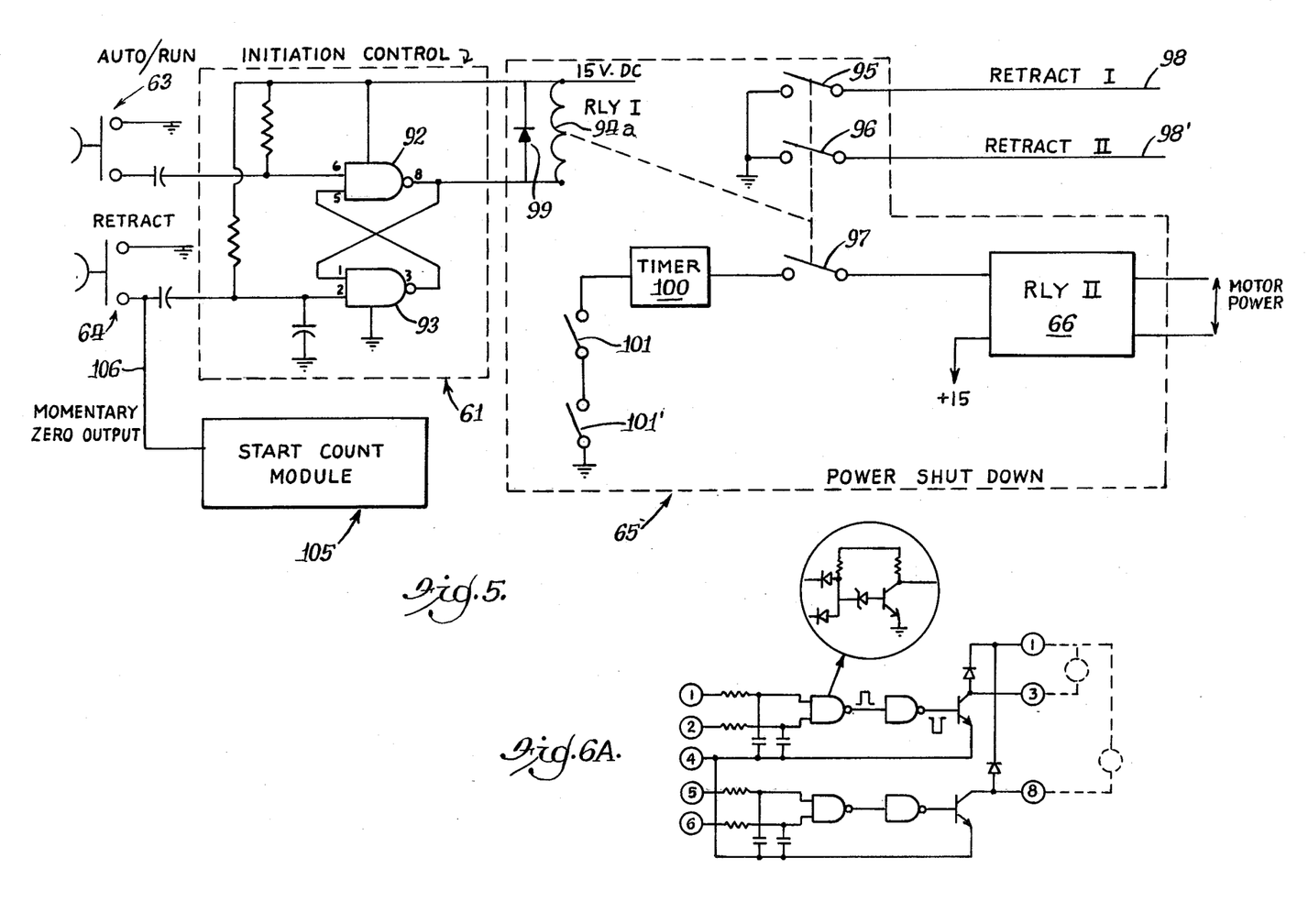
FIG. 5 is a schematic circuit diagram of the initiation control system indicated in FIG. 3.
FIG. 6A is a functional schematic circuit of a NAND GATE indicated in FIG. 6.

In order to better understand the workings of the direction speed control unit 60 and the initiation control unit 61, reference is made specifically to FIGS. 4 and 5 of the drawings showing the same in relation to sensor means 10.

FIG. 4 schematically illustrates a typical control circuit for the direction and speed control 60, the same including the photo resistor 16 which is rendered conductive at a level proportional to the level of is exposure to its light source 15. Photo resistor 16 is located in one leg of a balanced wheatstone bridge network having legs 75, 76, 77 and 78 connected between plus or minus 5 volt DC power supply conductors 79 and 80. When the light responsive unit 16 conducts its unbalances the bridge network to produce a "high" or "low" output signal at the pick off junctions 81 and 82 of the network. These signals are then fed to the appropriate input terminals of the transistors B and D of a four section transistor (ABCD) quad operating amplifier system. In this system the two amplifiers B and D constitute voltage followers to feed network A which sums and amplifies the resultant signals from B and D.

Output signals from A are fed to the base of transistor 83 which outputs "plus" or "high" directional control signals to the stepper motor logic in the stepper encoder 70 whenever the base of transistor 83 goes "minus" or "low". Conversely output from transistor 83 to the stepper encoder is "zero" or "low" whenever the base of transistor 83 is "high", connecting the 5 volt DC supply 79 to ground over conductor 84 and transistor 83, as illustrated.

In addition to supplying control signals to transistor 83, network A also supplies "plus" only input signals to the voltage controlled oscillator circuit 71 via conductor 85, diode $D_2$ and conductor 86. Negative output signals from network A are fed over conductor 85 to diode $D_1$, which passes the negative signals to inverter C; diode $D_2$ meanwhile blocking such negative signals from the oscillator 71. The negative input to the inverter C provides positive signals at diode $D_3$ which conducts to pass them over conductor 86 to the input of the oscillator network 71. The oscillator is joined to the 5 volt DC supply 79 by conductor 87 which infeeds to the "power" and "reset" input pins 89 and 90 of a timer chip 88. With the knowledge that the timer is in an always "on" state, the arrangement of the oscillator network is such that the input voltage causes the output frequency to vary via conductor 86. This operates to produce a "high" frequency output to the stepper encoder 70 whenever its input is "high" and vice versa, thereby to regulate the rotational speed of the associated stepper motor 40.

It will be understood of course that each of the stepper motors 40 is controlled by its own direction and speed control system of the above described order.

Turning now to the initiation control means 61, reference is made to FIG. 5 which shows the manually operated "auto" switch 63 and "retract" switch 64 for controlling input to an integrated flip-flop circuit comprising a pair of NAND GATES 92 and 93. Such gates control energization of a relay coil 94a for a no strip relay 94 which operates three normally open contact sets 95, 96 and 97. Closing of contact sets 95 and 96 supplies negative signals to direction speed control 60 for each sensor whereby to reverse the stepper motors. In essence closing of contacts 95 and 96 grounds the negative supply 80 of the balanced bridge network over conductor 98 (see FIG. 4). This causes an unbalance of the bridge network and ultimately produces retract signals to the stepper encoder 70 for reversing the direction of the stepper motor 40.

In normal operation, closing of the "auto" switch 63 renders the output of gate 92 "high" thereby holding the relay coil 94a de-energized and holding contact sets 95 and 96 "open". When retract switch 64 is closed the output state of gate 92 goes "low", energizing coil 94a to close contacts 95, 96 and 97. The diode 99 is supplied to prevent "inductive kickback" from coil 94a. This produces the negative unbalance of the sensor bridge network as above described to effect reversal of the stepper motors over their reverse control signal conductors 98 and 98'.

Closure of relay contact set 97 conditions the power shut-down control 65 for operation. It will be noted that this control unit includes a timer 100 in series with a pair of micro switches 101 and 101', the relay actuated switch 97 and the motor control relay 66 and associated normally closed relay contacts 67 in motor power supply conductor 103 (see FIGS. 3 and 5). In operation when the two sensor carriages back out to their outer limits, the two micro switches 101 and 101', located for engagement by the carriages 25, are closed. This activates control relay 66, after a time delay, disrupting motor power supply conductor 103 to de-energize the stepper motors, such as motor 40 in FIG. 3.

In addition to the motor reversing and shut-down functions for control unit 61 and 65 as described above, it will be observed that the control 61 also receives an input from a start count module or unit 105 associated with the measuring system to be described presently. Suffice it to say at this juncture, that when the start-count is at zero, indicating extreme inward movement of the sensor carriages, a momentary pulse is fed over conductor 106 to the reversing side of the flip-flop circuit, particularly to the input of NAND GATE 93, to effect automatic reversal of the stepper motors and carriages (see FIG. 5). It will be appreciated that this automatic reversing feature serves to energize relay 94, closing contacts 95 and 96 to supply the retracting signals which unbalance the sensor bridge network as previously described.

Figure 6:
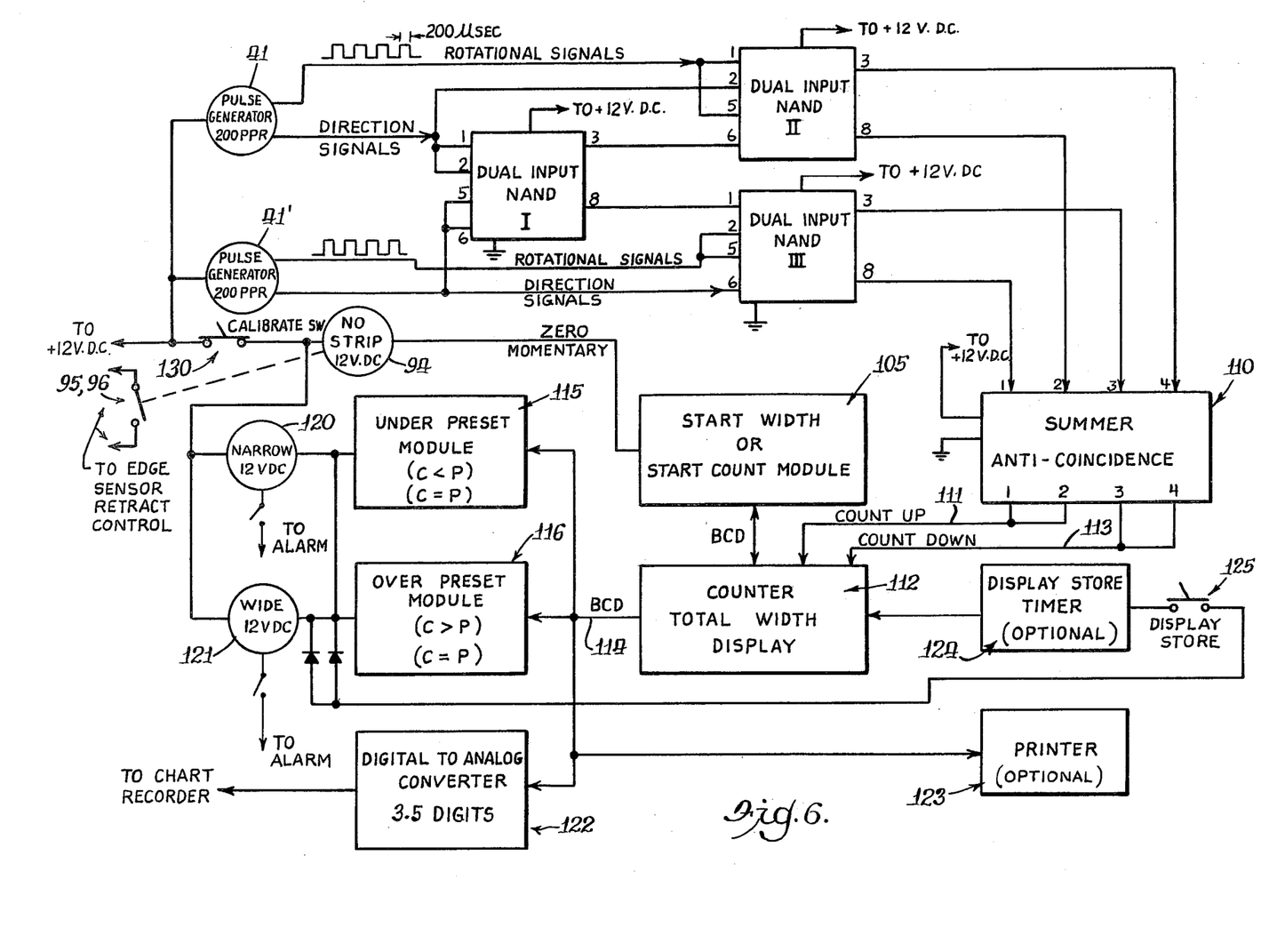
FIG. 6 is a functional block diagram of the monitoring and display systems.

Attention now is directed to the measuring system as represented by the functional block diagram of FIG. 6. As there indicated the two pulse generators 41, 41' one driven by each of the stepper motors, produce position signals which constitute the input to a conditioning logic network comprising three dual input buffered NAND GATES, designated I, II and III.

Since the signal generators are rotated by and with their associated stepper motors, the generated signal output therefrom is directly related to the positioning movements of the sensor carriages which are driven by the motorized lead screws. It also will be recognized that the signal generators normally rotate in opposite directions because they are reversely positioned on opposite sides of strip MS so that the two photo cell sensors may follow the opposite lateral edges of the intervening strip material MS. As arranged herein, clockwise rotation of the generators provide "low" signals and counterclockwise rotation "high" signals for the logic network. These are direction signals.

A functional schematic diagram for each of the several dual input NAND gates I, II and III is set out in FIG. 6A, indicating input pins 1, 2, 5 and 6 and output pins 3 and 8. In operation, if the input to pins 1 and 2 is "high", the output at pin 3 is "low". If either input pin goes "low" (substantially 4 volts DC) the output of that circuit is "off" or "high". The same applies for pins 5, 6 and 8.

In addition to the high and low level direction signals produced by each generator, such also produce generally square-wave AC signals of roughly 200 microsecond duration at the rate of 200 pulses per revolution, as indicated in FIG. 6. Since these signals depend on the rotation of the generator, they are directly related to the rotation of the stepper motors and lead screws and thus to the movements of the attached photo sensors.

As shown in FIG. 6, the direction signals of generator 41 are connected to input pins 1 and 2 of Gate I and pin 2 of Gate II. The rotational signals from generator 41, on the other hand, are input to pins 1 and 5 of Gate II. Similarly the direction signals of generator 41' are input to pins 5 and 6 of Gate I and to pin 6 of Gate III while the rotational signals therefrom are supplied to input pins 2 and 5 of Gate III. The output signals at pin 3 of Gate I are supplied to input pin 6 of Gate II while the output signals at pin 8 of Gate I are fed to the input pin 1 of Gate III.

The logic signals produced by such NAND GATE network are either "high" or "low", "up" or "down", plus a square wave signal depending on the direction of rotation of the generators. The particular arrangement in the illustrative case is such that inward movement of the sensor carriages produces "low" or "down" signals plus a square wave and reverse or outward carriage movement produces "high" or "up" signals plus a square wave.

Such output signals of the two Gates I and III are fed to four input pins 1–4 of an anti-coincidence Summer unit 110, which typically may comprise a model 511 Anti-Coincidence Summer, commercially available from Red Lion Controls, York, Pa. although other compatible Summer units may be used for this purpose. The operational functioning of the Summer unit 110 is to separate or prevent simultaneous input from being counted as one signal. In the particular illustrated case, the Summer unit 110 has four input pins 1, 2, 3 and 4 and four output pins 1, 2, 3 and 4. In the particular preferred arrangement illustrated, the upcount signals from generator 41 are supplied to input pin 2 of the anti-coincidence Summer and the down count signals from that generator are supplied to input pin 4 of the unit 110. The corresponding signals from generator 41' are supplied to input pins 1 and 3, respectively, of unit 110.

As noted above, the Summer unit operates to separate the incoming signals such as the "up" count signals at pins 1 and 2 by providing a time-delay therebetween before they are released to the "up" count conductor 111 for transmission to a total width counter 112. Similarly the "down" count signals at input pins 3 and 4 are separated and fed to the total width display counter 112 over the "down" count conductor 113. This separation and time-delay between successive output signals of the anti-coincidence Summer effectively prevents overlapping signals at the total width display counter, thereby insuring that all incoming signals are accounted for in counter 112.

The total width display counter 112 constitutes a typical up-and-down count Summer, such as a series 600 Counter, available from Red Lion Controls, York, Pa. In operation, counter 112 adds or subtracts digits from a previously set level, according to the "up" count and "down" count pulses received from the anti-coincidence Summer 110. That is to say, if the strip width narrows than the "down" counts will be subtracted from the initial set strip width count and conversely as the strip widens, "up" counts are added thereto in counter 112. It will be recognized that lateral movements of the strip between the sensors produces a "down" count on one side and an "up" count on the other. However, unless there is an actual change in the strip's width dimension, the total count in counter 112 will remain static, or the same. In any event the total width display counter 112 continuously counts the "up" and "down" count input pulses fed thereto and indicates the net result or sum representing the distance between the two sensor carriages.

The total width display counter is coupled to the start count module 105 of known construction, such as a model 685 Start Count Module, available from Red Lion Controls, York, Pa. A start count module provides a means for preloading a start count number into the total width display counter 112 in those situations where the total width display counter is to be started at some count other than zero. In operation the start count module strobes a start count number into the total width display counter one digit at a time. These digits are loaded into the total width display counter in a binary code decimal (BCD) form to provide the starting count data, starting with the most significant digit and going through to the least significant digit. The signal output from the start count module is in binary code decimal form (BCD) for cooperation with other units of the measuring system, as will be described presently.

As shown in FIG. 6, total width display counter 112 has a BCD output 114 which is fed to one or more preset modules 115 and 116, whereby the total width as indicated on the display counter 112 may be constantly compared with preset over-and-under limits in the preset modules in a known manner.

Briefly, each of the preset modules 115 and 116, such as a model 680 Preset Module, available from Red Lion Controls, York, Pa., continuously monitors the BCD output of the total width display module 112, comparing the running count on the latter with a preset limit number that has been manually set into the preset module via thumb wheel switches. In the particular illustrated case module 115 produces an "on" signal for the condition where the total display count is less than or equal to the preset under-size limit count. On the other hand, preset module 116 turns "on" when the total width display count on module 112 is greater than or equal to the maximum preset tolerance number set therein.

With this arrangement, when the total width counted on the display counter 112 is equal to or less than the under-size tolerance set in module 115 or is greater than or equal to the over-size tolerance set in module 116, relays 120 or 121 are respectively energized to close circuit to alarm systems, either visual or audio as desired.

The counter 112 also may provide its BCD output to a conventional Digital Analog converter unit 122 which feeds a chart recorder (not shown) and an optional Printer module 123 whereby the total count width indicated at display module 112 and compared by the preset modules 115 and 116 may be permanently recorded for the operator.

As a further option the Total Width Display counter also may be coupled with a display store timer 124 which may be energized by depressing a manual "on" or "off" switch 125 whereby to effect a permanent locked display of the measured width indicated on the total width display counter.

In addition to its start count input capability, the Start Count module 105 also produces a pulse signal of momentary duration whenever it reaches a zero count indication from the BCD output of the total width display counter. When this condition occurs, the Start Count module feeds a signal to the initiation control 61, as previously related, to effect reversing activity of the two carriages, backing them out or away from the centrally disposed zeroizing bracket and effecting closure of the micro switches 101 and 101' to automatically close down the machine through the shut-down control 65 as above described.

As indicated in FIG. 6 of the drawings, a normally closed manually operated calibrate switch 130 is provided in the 12 volt DC supply for the relays 94, 120 and 121, respectively associated with the under and over preset modules 115 and 116 and the start count module 105. By opening switch 130 the power to the relays 94, 120 and 121 is removed so that during calibration the alarms operated off of relays 120 and 121 are inoperable. Likewise the no-strip relay 94, which responds to a zero width signal count from the Start Count Module, also is disabled, thereby avoiding automatic reversing of the carriage movements. Consequently with switch 130 open it is possible, by depressing the auto start button, to move the carriages into the zeroizing bracket for a calibrating function. When it is desired to reverse the carriages to their outermost limits, closure of the calibrate switch and operation of retract switch 64 will cause the carriages to travel outwardly to their outer limits.

When it is desired to calibrate the machine, the calibrate switch 130 is opened as explained above and the auto start button is closed. This causes the carriages to advance toward the center of the machine until they both reach the mechanical zeroizing fixture 50. This fixture is permanently located at the center line of the machine which is aligned at right angles to the center line of the product being measured. When the two carriages and their sensors are at their zeroizing positions, the center line of the two edge sensors are mechanically aligned by nulling the sensors in fixture 50. The start count module is now manually set to zero along with the digital totalizer or total width count module. The carriages are then backed out to the mechanical reset point for maximum width. The desired start count width is now manually set in the start count module 105 and transferred to the total display count module 112. The over and under preset limit modules 115 and 116 also are manually set at their selected tolerance limits over and under the start count width for the strip to be measured. Once this has been completed, switch 130 is closed, the strip material inserted between the sensors and the auto run button depressed so that the carriages move toward one another until the two edge sensors capture the opposite edges of the material. As the carriages move inward the count displayed on the total count module reduces until edge capture occurs. The count display at this point should be between the over preset and under preset count module settings. The system, is thus calibrated and continues to operate between the preset limits until such times as it exceeds one of these limits. When this occurs one of the relays 120 or 121 is energized to produce an alarm signal for the operator to see or hear and/or start the optional printer. The total count module will always display the material width in inches or millimeters, as selected, for the operator to observe. The optional printer can be set to print at given intervals of time or length of sheet travel or may print automatically when either of the alarms is energized.

Having described this invention it is believed that those familiar with the art will readily recognize its advancement over prior devices of this general character and will appreciate and understand that while the same has been described above in association with a preferred embodiment, the same is susceptible to modifications and substitutions of equivalents without departing from the spirit and scope of the invention as defined in the following appended claims.

The embodiments of the invention in which an exclusive property or privilege is claimed are defined as follows:

1. A width detector system for constantly monitoring and measuring the width of moving elongated strip materials, comprising: a pair of carriages, one movably mounted adjacent each lateral edge of a strip of material to be measured; a pair of sensor means mounted, one on each carriage, for movement therewith along parallel paths transversely of the elongated axis of said strip material; each sensor means comprising a light source and a photo sensitive cell disposed on opposite faces of said strip material and productive of signals proportional to the intensity of light received by said cell; a pair of drive means, one for bidirectionally moving each carriage and sensor means; a pair of pulse generators, one operatively driven by each drive means, and operable to generate positive and negative output signals dependent on the direction of travel of said carriages along said paths; control means responsive to signals from each sensor means for controlling its associated said drive means whereby to cause each sensor means to independently follow an adjacent edge of said material, and measurement means responsive to the combined output signals of said generators for constantly monitoring the distances of said sensor means from a fixed datum including means for totalizing said distances whereby to determine the measured distance between said sensor means representing the width of said material.

2. The combination of claim 1, and means responsive to said measurement means for initiating alarm means in the event said measured distance exceeds predetermined tolerance limits.

3. The combination of claim 1, and means for setting tolerance limits for the measured distance between said sensor means, and means responsive to said measurement means for initiating alarm means in the event said tolerance limits are exceeded.

4. The combination of claim 1, and a zeroizing fixture mounted centrally between said sensor means and providing said reference datum from which the distance of each sensor means is determined by said measurement means.

5. The combination of claim 4, wherein said measurement means responds to the movement of each sensor means relative to said fixed datum reference in determining the distance between said sensor means.

6. The combination of claim 1, wherein each said drive means comprises a stepper motor and rotatable screw means for bidirectionally moving each carriage and sensor means.

7. The combination of claim 1, and means for manually controlling the directional movements of said carriages and sensor means.

8. The combination of claim 1, wherein said measurement means comprises counting means and means for visually displaying the distance count between said sensor means, means for automatically reversing each of said carriages to move away from one another whenever said counting means indicates a zero distance, and means for de-energizing said drive means when said carriages remain at their limits of separating movement for a predetermined time.

9. The combination of claim 8, and manually operable means for overriding said means for automatically reversing said carriages.

* * * * *